F. H. VAN LOOZEN.
DEMOUNTABLE RIM.
APPLICATION FILED MAR. 10, 1921.
1,423,283.
Patented July 18, 1922.
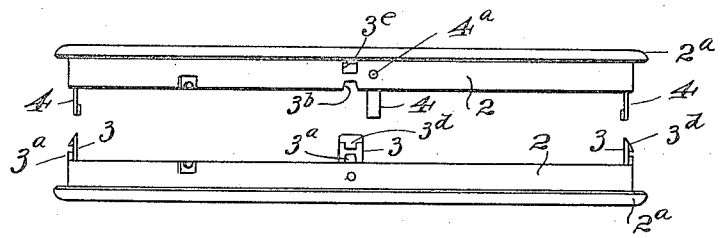
Fig. 1
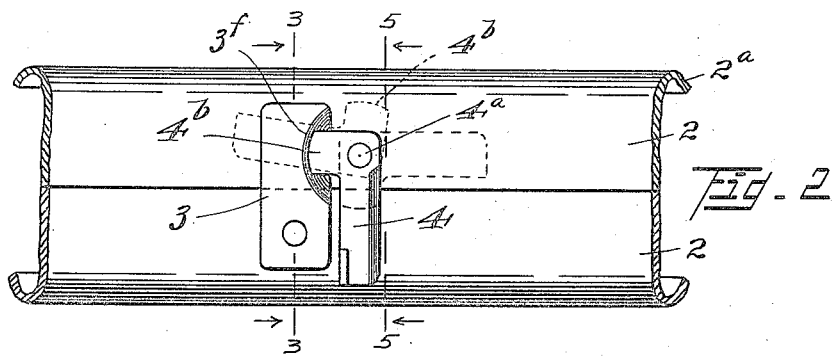
Fig. 2
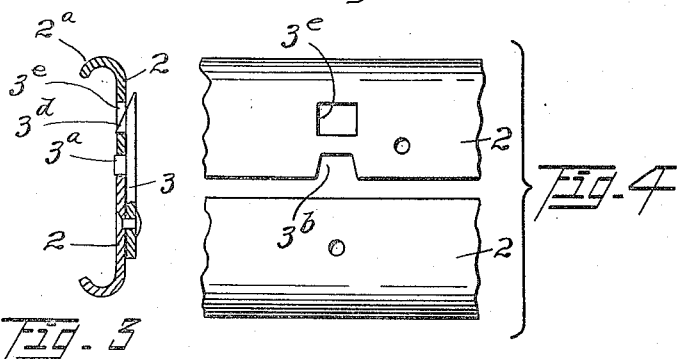
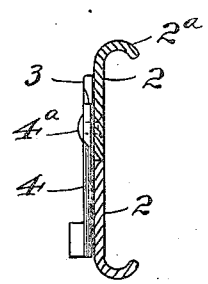
Fig. 3  Fig. 4  Fig. 5
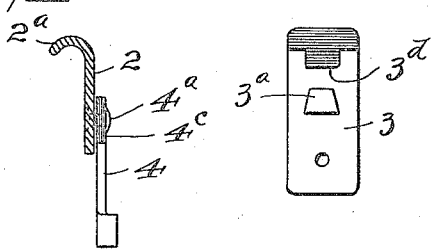
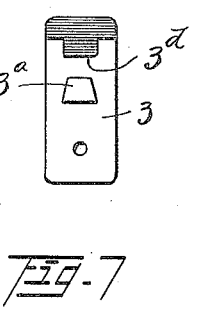
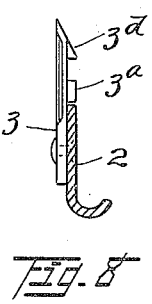
Fig. 6  Fig. 7  Fig. 8
Inventor
Fred H. Van Loozen
By
Ced L. Billman
Attorney

UNITED STATES PATENT OFFICE.

FRED H. VAN LOOZEN, OF LAKEWOOD, OHIO.

DEMOUNTABLE RIM.

1,423,283.  Specification of Letters Patent.  Patented July 18, 1922.

Application filed March 10, 1921. Serial No. 451,385.

*To all whom it may concern:*

Be it known that I, FRED H. VAN LOOZEN, a citizen of the United States, residing at Lakewood, in the county of Cuyahoga and State of Ohio, have invented certain new and useful Improvements in Demountable Rims, of which the following is a specification.

My invention relates to improvements in demountable rims, and more particularly to that class or type which are used in connection with motor vehicle wheels and pneumatic tires.

The primary object of the invention is to provide a generally improved demountable rim of this class, which will be exceedingly simple in construction, cheap of manufacture, and efficient in use.

More specifically speaking, my invention relates to certain improvements in details of construction disclosed in my improvements in demountable rims patented to me March 9, 1920, No. 1,333,232, the present improvements combining with such cross coupling members as disclosed in said Letters Patent, certain improved locking and unlocking members arranged in suitable proximity to said cross coupling members on the under side of said rim sections, and being adapted in one position to lock said coupling or rim section connection members and in another position to engage with and ride under the free ends of said cross coupling members to detach and hold the same in detached positions until the rim sections are separated.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a disassembled view of a demountable rim preparatory to bringing the two rim sections thereof together and locking the same in position in the act of securing a tire casing thereon.

Fig. 2, an enlarged fragmentary plan view of the inner side of the same assembled and illustrating in particular the coupling and locking and unlocking members thereof.

Fig. 3, a cross sectional view of the same taken substantially on line 3—3 of Fig. 2.

Fig. 4, a fragmentary disassembled view of the coupling or recess portion of the rim section with the coupling and locking and unlocking members removed.

Fig. 5, a cross sectional view of the same in locked position taken substantially on line 5—5 of Fig. 2.

Fig. 6, a cross sectional view of one of the rim sections showing the inner side of the pivoted locking and unlocking member.

Fig. 7, a plan view of the inner side of one of the cross or coupling members, detached.

Fig. 8, a cross sectional view of one of the rim sections with a side or edge view of one of the attached cross coupling members.

Similar numerals of reference designate like parts throughout all the figures of the drawings.

The improved demountable rim is adapted to be mounted upon and attached to any suitable or convenient vehicle wheel in any convenient and suitable manner.

As a convenient means of readily attaching the tire rim to or detaching the same from a pneumatic tire, the tire rim is preferably circumferentially divided by being made up of abutting rim sections 2, the latter being preferably in the form of companion sections abutting at the median or central portion of the rim and terminating at the sides in tire engaging flanges $2^a$. These flanges may be either of the straight sided type, or of the clencher form, as shown in the drawings.

As a means of readily attaching or detaching the rim sections 2, to and from each other, respectively, in the act of assembling and disassembling with respect to the tire casing, and particularly as a means of interlocking the companion rim sections together to prevent relative lateral or circumferential movement when secured to the tire casing and mounted upon the vehicle wheel, the rim sections 2, are provided with oppositely arranged cross or coupling members 3. The coupling members 3, preferably embody suitable key or lug members $3^a$, extending from and abutting against the inner side of one of the rim sections and adapted to enter into and interlock with correspondingly shaped recesses $3^b$, in the adjacent or abutting side of the opposite or companion rim member. The cross or coupling members 3, are secured beneath the rim sections 2, in any suitable and convenient manner, as for example,—by means of rivets as shown, or by spot welding, or the like, and as a means of automatically connecting the cross or coupling members 3, to the adjacent or opposing rim section, such coupling members 3, are preferably provided at their free ends with locking projections 3ᵈ, which latter are preferably inclined or beveled on their under sides toward the free ends thereof, as shown most clearly in Figs. 3, 7 and 8 of the drawings, said locking projections being adapted to enter correspondingly formed and located projection receiving openings 3ᵉ.

As a means of causing the inclined or under tapered hook projections 3ᵈ, to be brought into registry with the openings 3ᵉ, when the companion rim sections are brought together, and particularly as a means of preventing relative circumferential movement of the rim sections when assembled, the sides of the key or lug members 3ᵃ, are tapered in a converging relation toward the free ends, and so likewise the sides of the recesses 3ᵇ, adapted to receive the same.

As a means of positively locking the free ends of the cross members 3, carrying the projections 3ᵈ, and lugs 3ᵃ, rotary locking and unlocking lever members 4, are mounted in suitable proximity to the recesses 3ᵇ, and openings 3ᵉ, by means of pivots 4ᵃ, said locking and unlocking lever members being provided with arm or nose portions 4ᵇ, preferably beveled on their under sides as at 4ᶜ, (see Fig. 6), so that when the main arm of the lever member is moved transversely of the rim sections and to the full line position shown in Fig. 2 of the drawings, the short arm or nose portion 4ᵇ, will engage and ride over the beveled portion 3ᶠ, of the adjacent cross coupling member, and thus hold the latter down to prevent accidental detachment. When it is desired to unlock or release the cross coupling members, the levers 4 are moved to a position corresponding approximately to the first dotted line position shown in Fig. 2 of the drawings, or at right angles to the first position, thereby moving the short arm or nose 4ᵇ, off of the edge of the coupling section, and as a means of positively detaching the free ends of the cross members 3, and elevating the same thereby lifting out and holding the projections 3ᵈ, from the subjacent openings 3ᵉ, the lever members 4, are moved to their extreme reverse position corresponding to the second dotted line position shown in Fig. 2 of the drawings, the opposite sides of the lever members passing under the inclined free ends of the cross coupling members and elevating and holding the parts out of engagement, this operation being successively carried out with respect to the successive cross members until all are detached, whereupon the rim sections may be readily separated. If desired, the edges of the handle members may be provided with slight projections 4ᵈ, to more effectively permit the operation of the handles.

Having thus described my invention, without having attempted to set forth all the modes of its use or all the forms in which it may be made, what I claim and desire to secure by Letters Patent, is,—

1. In a demountable rim, a pair of abutting circumferentially divided rim sections provided with subjacent spring coupling members, and lever members adapted in one position to hold said spring coupling members in locked position and in another position to engage and unlock the same.

2. A demountable rim made up of circumferentially divided rim sections provided on their under sides with spring coupling members extending across the abutting portions thereof and engaging and interlocking with the companion rim section, and lever members in co-operative relation therewith adapted in one position to ride over and hold down said coupling members in locked position, and in another position to pass under and unlock said coupling members whereby said rim sections may be separated.

3. In a demountable rim, the combination with circumferentially divided rim sections provided on their under sides with spring coupling members adapted to engage with a companion rim section, and pivoted lever members in co-operative relation to said coupling members adapted in one position to lock the same in engagement and in another position to detach and hold the same out of engagement with the companion rim section.

4. A tire rim, comprising circumferentially split rim sections provided with subjacent resilient cross coupling members carrying tapered key and locking projections detachably seated in corresponding openings and recesses in the opposite rim section, said openings being opposite said recesses and the latter and said keys being tapered to centralize said locking projections in said openings when said rim sections are brought together, and co-operating locking and unlocking lever members pivoted in proximity to said cross coupling members.

In testimony whereof I have affixed my signature.

FRED H. VAN LOOZEN.